United States Patent [19]
Juda et al.

[11] 4,331,520
[45] May 25, 1982

[54] PROCESS FOR THE RECOVERY OF HYDROGEN-REDUCED METALS, IONS AND THE LIKE AT POROUS HYDROPHOBIC CATALYTIC BARRIERS

[75] Inventors: Walter Juda, Lexington; Robert J. Allen, Saugus; Robert Lindstrom, Gloucester, all of Mass.

[73] Assignee: Prototech Company, Newton, Mass.

[21] Appl. No.: 88,373

[22] Filed: Oct. 26, 1979

[51] Int. Cl.³ .................... C25C 1/10; C25C 1/20; C22B 15/12; H01M 4/92

[52] U.S. Cl. .................... 204/105 R; 204/106; 204/109; 204/112; 204/284; 204/290 R; 204/294; 204/DIG. 3; 204/105 M; 75/0.5 A; 75/108; 75/117; 75/118 R; 75/121; 423/22; 423/23; 423/25; 423/49; 423/99; 423/138; 429/42

[58] Field of Search ............. 204/105 R, 105 M, 106, 204/109, 112, 115, 277, 144, 129, 290 R, 284, 294, DIG. 3; 75/108, 121, 0.5 A, 0.5 R, 117, 118 R, 101 BE; 429/42; 423/22, 23, 49, 99, 138, 25

[56] References Cited

U.S. PATENT DOCUMENTS

| | | | |
|---|---|---|---|
| 3,103,474 | 9/1963 | Juda | 204/DIG. 3 |
| 3,793,165 | 2/1974 | Juda et al. | 204/106 |
| 3,957,506 | 5/1976 | Lundquist, Jr. et al. | 75/101 BE |
| 4,044,193 | 8/1977 | Petrow et al. | 429/42 X |
| 4,059,541 | 11/1977 | Petrow et al. | 75/0.5 R X |
| 4,159,309 | 6/1979 | Faul et al. | 75/108 X |
| 4,163,811 | 8/1979 | Kohlmayr et al. | 429/42 X |
| 4,166,143 | 8/1979 | Petrow et al. | 429/42 X |

Primary Examiner—Donald R. Valentine
Attorney, Agent, or Firm—Rines & Rines, Sharpiro & Shaprio

[57] ABSTRACT

This disclosure concerns primarily the recovery of hydrogen-reduced metals from aqueous solutions of salts thereof, by hydrogen reduction at a porous hydrophobic catalytic barrier, at ordinary temperatures, in an apparatus provided with means to supply hydrogen to one face and aqueous solution to the other face of said barrier.

25 Claims, 3 Drawing Figures

4,331,520

PROCESS FOR THE RECOVERY OF HYDROGEN-REDUCED METALS, IONS AND THE LIKE AT POROUS HYDROPHOBIC CATALYTIC BARRIERS

The present invention relates to the hydrogen reduction, at porous hydrophobic catalytic barriers of hydrogen-reducible ions in solution, and more particularly, though not exclusively, to the recovery of metals from aqueous solutions of such metal ions at ordinary temperatures.

The term "hydrogen-reducible ion", as used in this specification and the appended claims, means an ion producing a positive potential when it is reduced in aqueous solution in the electrochemical reaction in which hydrogen gas goes to hydrogen ion, i.e. $H_2 \rightarrow 2H^+ + 2e$; that is, the reduced ion has an oxidation potential below that of hydrogen. Recoverable metal ions yielding "hydrogen-reduced metals" in this reaction, as this term is used herein, include such metals as copper, silver, gold, the platinum metals and the like; whereas "partially hydrogen-reducible ions", include the ferric, mercuric, permanganate and similar ions which are reduced in solution from a higher valence state to a lower valence state without normally being reduced to the metal. Finally, the term "ordinary temperature", as used in the specification and claims, is intended to connote ambient temperatures and above; but in any event, temperatures below about the boiling point of water.

Underlying the invention in one of its important aspects is the discovery of an unexpected behavior of porous hydrophobic catalytic barriers, void of external electrical connections, when directly contacted on opposite surfaces by hydrogen gas and, for example, an aqueous solution of a hydrogen-reducible metal ion. Considering, for example, the interesting case of a copper ion solution, such as copper sulfate, the art is replete with different types of electro-deposition techniques for extracting the copper metal from the solution, generally as a cathodic deposition.

In, for example, U.S. Pat. No. 3,793,165 of common assignee herewith, a method is described for electrodepositing copper and the like from an aqueous copper salt solution by means of a hydrogen anode. Care is taken to prevent physical contact of the copper salt solution and the anode, however, to avoid deposition of copper on said anode, instead of the desired deposition of massive electro-plated copper on the cathode, as otherwise it was expected that the process would become self-arresting because the hydrogen anode becomes rapidly covered by the metal, part of which is chemically reduced at the anode, thus requiring removal of the anode and cleaning before reuse. (Col. 1, lines 37–42).

Surprisingly, we have now found that upon contacting, at ordinary temperatures, one face of an appropriate porous hydrophobic catalytic barrier with an aqueous solution of a hydrogen-reducible metal ion, such as the before-mentioned copper sulfate solution, and applying hydrogen to the other face of said barrier, the reduction and deposition of copper occurs in the absence of any external electrical circuit. It has further been found that the buildup of copper on the solution-contacted face is not arrested by the initial layer of copper, but continues to any desired level of removal of said copper from said solution.

While above-described with reference to the exemplary illustration of copper metal, this technique has also been found to be useful for the reduction of a partially hydrogen-reducible ion, such as, for example, the reduction of the ferric to the ferrous ion or the mercuric to the mercurous ion, as later described, with recovery of the reduced ion either as a deposition on the barrier as in the mercurous case, or in solution, as in the ferrous reduction. In all cases, however, the reduction is carried out by supplying hydrogen to one face of the barrier and the ion solution to the other face of the barrier. The apparatus does not require, and hence excludes, the usual circuitry of an electrochemical cell (including two separate electrodes and an external electrical path), and the apparatus is therefore sometimes referred to hereinafter as "circuitry-free".

An object of the invention, accordingly, is to provide a new and improved process and apparatus for the recovery of hydrogen-reduced metals and ions, employing hydrogen reduction at hydrophobic catalytic barriers.

A further object is to provide such a novel process and apparatus that is particularly useful for the recovery of metals from aqueous solutions thereof.

Still another object is to provide for the improved recovery of metals by depositing the same upon such barriers from a dilute aqueous solution thereof and to enable the subsequent removal of the deposited metal by well-known techniques.

An additional object is to provide an improved process whereby the metal deposited on the barrier may also be dissolved from the barrier by catalytic or electrochemical oxidation in the presence of a small volume of electrolyte to produce a concentrated aqueous solution thereof which can then be subjected to metal electrowinning or electrorefining and the like.

Other and further objects will be explained hereinafter and are more particularly delineated in the appended claims.

In summary, however, from one of its broader aspects, the invention embraces a process for recovering hydrogen-reduced metals or ions from an aqueous solution of an ionized salt thereof, that comprises, providing a porous hydrophobic catalytic barrier, contacting one surface of the barrier with said solution, and applying hydrogen gas to said other surface, thereby to produce the hydrogen-reduced metals or ions at said one surface. Preferred and best mode embodiments and details are later presented.

The invention will now be described with reference to the accompanying drawings, FIG. 1 of which is a schematic longitudinal section of a preferred apparatus for carrying out the process of the invention;

Figure 1:
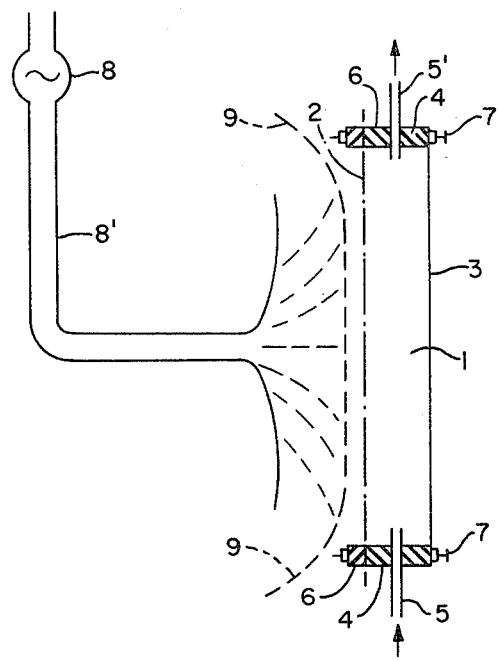

In general, suitable barriers for the purpose of this invention are porous to hydrogen and at the same time hydrophobic to the aqueous solutions so that the liquid and gas phases remain separate while permitting the hydrogen ionization reaction to take place on the catalyst of the barrier. The barrier prevents intermingling of hydrogen and solution, thereby allowing separate control of flow rates and easy confinement of hydrogen gas, at or near atmospheric pressure, for good hydrogen utilization (for example, by recycling the hydrogen).

Any catalyst for the hydrogen ionization reaction is suitable, but platinum catalysts are preferred because of their corrosion resistance and durability. In particular, the platinum catalysts having a particle size substantially between 15 Å and 25 Å when deposited on finely divided high surface area carbon carriers, (herein referred to as 15–25 Å platinum-on-carbon catalysts) as described, for example, in U.S. Pat. Nos. 3,992,331, 4,044,193 and 4,059,541 of common assignee herewith, have been found to be especially effective in amounts between 0.05 and 0.5 g/sq. ft. of barrier, in catalyzing the hydrogen ionization reaction at ordinary temperatures.

The hydrogen-ionizing catalysts is preferably deposited, together with a hydrophobic agent such as a fluorinated hydrocarbon polymer (herein referred to as Teflon) on an electrically-conducting porous substrate such as a metal screen, a porous carbon, and, especially a carbon yarn cloth as described in our copending application Ser. No. 079,470, comprising, for example, PANEX-type carbon cloth of the Stackpole Fibers Company. The resulting barrier has the structure of a typical gas diffusion (hydrogen) electrode, even though, in accordance with this invention, the hydrogen reduction thereon is carried out in the absence of an external electrical circuit. It is often advantageous to use such a hydrogen electrode in the case of, for example, copper recovery because the copper deposited on the barrier can then be removed from the barrier by an electrolytic process, such as in a copper refining cell in which the copper-covered barrier is used as the anode. The recovery of silver from, for example, a silver nitrate solution can benefit similarly from the use of barriers of such carbon-based substrates.

However, electrically insulating porous substrates, such as a porous ceramic, a glass cloth, or a porous glass fiber mat, are also suitable substrates for the illustrative platinum-on-carbon-Teflon mixture (or other catalyst hydrophobic mixture) uniformly deposited thereon, since the reduction of the present invention, as before stated, takes place in the absence of external circuitry. When, for example, copper is deposited on such a barrier from a dilute copper sulfate solution, it can then be removed from the barrier by contacting the coppered face with a small volume of a solution of sulfuric acid and contacting the gas face with air or oxygen, whereby the oxidation and subsequent dissolution of the copper into the acid is catalyzed again at ordinary temperatures, by the platinum catalyst of the barrier. The copper removed from the barrier into the small volume of solution has now been concentrated many fold over the original dilute solution, thereby constituting a suitable feed for conventional electrowinning of copper or the method of the above-mentioned U.S. Pat. No. 3,793,165. This technique is, of course, also applicable to the above-described hydrogen electrode type barrier.

The removal of, for example, copper by anodic redissolution or by oxidation, can be carried out by keeping the barrier in a fixed position and alternating (1) the flows of dilute and concentrated solutions and (2) the flow of hydrogen and D.C. current or air/oxygen, respectively. When, however, a flexible cloth-based barrier is used, the barrier may conveniently be continuously moved from the dilute solution with hydrogen behind the barrier, to effect copper deposition on said barrier, to, for example, a tank containing concentrated solution to effect copper removal therefrom, as above explained.

The metal deposited on the barrier, if the barrier substrate is combustible as in the case of the before-mentioned carbon cloth, may be removed by incinerating the same. Scraping or mechanical stripping may also be useful in some instances. The recovery of platinum metals, especially of platinum and palladium, which are excellent catalysts for the $H_2 \rightarrow 2H^+ + 2e$ reaction, is advantageously carried out on a barrier which bears a platinum-on-carbon-Teflon mixture or a palladium-on-carbon-Teflon mixture, respectively. There is then built up on said barrier, by the hydrogen reduction of this invention, a deposit of platinum or palladium, respectively, in amount far in excess of the initial amount present on said barrier. In view of the high values of platinum and palladium, by comparison with the cost of carbon and Teflon, simple incineration of the barrier yields directly the recovered platinum or palladium, respectively, as the residue. In the case of platinum, especially, incineration is indeed the preferred method of recovery from the barrier because of the outstanding resistance of platinum to redissolution by chemical and electrochemical oxidation at ordinary temperatures.

In the absence of agitation of the aqueous solution, the rate at which the hydrogen-reduced metal, for example, copper, is deposited on the barrier is diffusion-controlled. In the case of dilute solutions of metal, for example, copper sulfate solutions containing between about 0.1 and about 5 grams/liter copper, it is usually important to agitate the solution or otherwise provide substantially turbulent flow of solution onto the barrier, to overcome the limitation of the low diffusion rate of a stagnant dilute solution. Thus, in the case of metal recovery from dilute solutions, the apparatus is advantageously provided with means to agitate the solution as by directing the flow of solution onto said barrier under rapid flowing conditions.

A typical circuitry-free apparatus suitable for the purpose of this invention comprises the barrier assembly, a cross section of which is schematically shown in FIG. 1. A gas plenum 1 is bounded on one side by, for example, a flat sheet of plastic 3, such as of Lucite, and on the other side by the flat hydrophobic catalytic barrier 2 of the invention, with the two sides of the plenum being kept apart by gaskets 4 as of rubber, plastic or the like. The gaskets are provided with gas inlet and outlet ports 5 and 5', respectively, with hydrogen applied to the right-hand face of the barrier 2 through the inlet 5. A gasket 6 holds the hydrophobic barrier 2 in place, with the assembly being clamped together by means, for example, of clamp 7. While flexible gasket 4 serves to make the plenum 1 gas-tight, the gasket 6 can be of any material, flexible or stiff, enabling the holding of the hydrophobic barrier 2 in place. A pump 8 feeds the metal or other ion solution through piping 8' to a distributor head 9, the latter being designed to permit even (and, when turbulent flow is desired, rapid) flow of solution onto the preferably total left-hand face of the barrier on which the metal, for example, is to be deposited.

Figure 2:
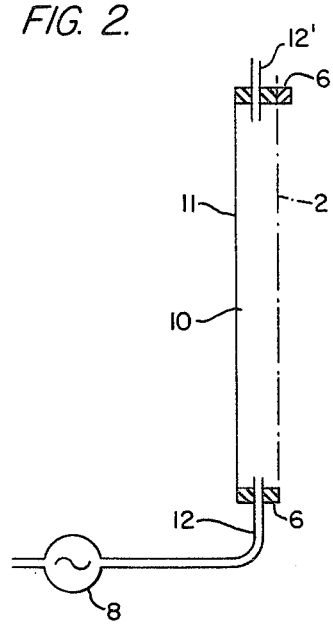
FIG. 2 is a similar view of a modification.

FIG. 2 shows, in cross section, an alternate assembly for flowing the aqueous solution onto the barrier 2 under controlled and, when desired, rapid flow rates. Here the barrier 2 with its gasket 6 constitutes one side (the right side) of a solution plenum 10 bounded on the other side by a plastic sheet 11. The solution plenum 10 is provided with a solution inlet 12 and an outlet 12', with the solution being circulated through the plenum 10 at turbulent flow rates when desired, by means of the pump 8.

Other shapes than flat barriers are also suitable. By way of example, a porous carbon or ceramic tube or pipe can be made into a porous hydrophobic catalytic barrier by coating its outside with the hydrogen-ionizing catalyst-Teflon mixture. When a hydrogen-reducible metal ion-bearing solution is flowed over the outside of such a tube or pipe barrier, and hydrogen gas is fed to the inside thereof, the metal is deposited on the outside of the tube or pipe. Other flow and barrier configurations will also occur to those skilled in the art.

One case of special importance that is particularly useful with the invention is the recovery of copper from dilute copper-bearing leach solutions such as are obtained by sulfuric acid leaching of low grade mine and waste dump materials. Such solutions contain less than about two grams per liter of copper and also small amounts of the order of 3 grams or less of total iron per liter, the iron being present as ferric and ferrous ions in the approximate ratio of, for example, about 1:2. Copper is now commonly recovered from such solutions by cementation; i.e. by reduction of $Cu^{++}$ and $Fe^{+++}$ with scrap iron, which recovery is costly and causes accumulation of iron in dumps.

We have reduced $Fe^{+++}$ in dilute ferric sulfate solution; and we have recovered copper from dilute copper sulfate solution and from dilute solution containing $Cu^{++}$, and $Fe^{+++}$ by the above-described hydrogen reduction process and apparatus, such copper-bearing solutions containing as little as 0.2–0.3 grams per liter (g/l) of copper, as shown in the following Examples 1 and 3, illustrating a preferred method of recovering hydrogen-reduced metals in accordance with the invention.

EXAMPLE 1

A two-plenum apparatus consisting of the gas plenum shown schematically in FIG. 1 and the solution plenum shown schematically in FIG. 2 was provided with a porous hydrophobic catalytic barrier having an exposed area 2" by 2" in size, said barrier having been prepared by the following procedure.

A platinum-on-carbon sample was prepared substantially in accordance with Example 1, col. 9 of U.S. Pat. No. 4,044,193, the pH being adjusted to 3 during the preparation. The air-dried material, containing 9.9% by weight of platinum on Vulcan XC-72 carbon, which carbon has a surface area of approximately 200 m²/g, was compounded with 50% by weight of wet-proofing fluorinated hydrocarbon, herein referred to as Teflon, hereby a typical catalytic carbon-Teflon mixture was formed. The compounding may advantageously use the technique described in U.S. Pat. No. 4,166,143 of the present assignee. In this example, 1.0 gram of the platinum-on-Vulcan carbon was suspended in 60 ml of distilled water containing 1.4 g/l of lanthanum sulfate. The suspension was ultrasonically dispersed and 11.75 ml of the aqueous colloidal Teflon dispersion described in col. 1 lines 35-44 of U.S. Pat. No. 4,166,143, containing 85 g/l, was added and the stirring was continued for 5 minutes, whereby the Teflon was completely flocced, forming the uniform catalytic carbon-Teflon mixture. The floc-containing liquid suspension was then filtered, leaving, on the filter, the mixture in a form of a paste suitable for coating the substrate. The coating procedure consisted in applying 0.38 gms of the paste to 9 sq. inches of the above-described carbon cloth PANEX PWB-3, the paste being spread uniformly on the surface and into the open pores of the cloth. The coated fabric is then heated to 340° C. for about 20 minutes. The resulting electrode-type structure had a platinum loading of 0.32 mg/cm² of electrode area, the platinum being in the form of particles predominantly in the 15-25 Angstrom range.

Hydrogen was fed to the gas plenum at the rate of about 50 ml/min. under a pressure of 5 inches of water above atmospheric. 500 ml of copper sulfate solution containing initially 0.296 g/l copper and having an initial pH of 1.95 was recirculated at a flow rate of about 2500 ml/min. through the liquid plenum 10, with the stream of solution directed across the left-hand face of the barrier 2. The solution was maintained at substantially constant room temperature of about 25° C. One ml aliquots of the recirculating solution were taken at successive time intervals and the copper concentration in the aliquots was determined by atomic absorption. The rate of copper removal from this solution is shown in Table 1.

TABLE 1

| Time | Grams/liter $Cu^{++}$ in Feed |
| --- | --- |
| 0 | 0.296 |
| 5 mins. | 0.267 |
| 15 mins. | 0.250 |
| 30 mins. | 0.215 |
| 60 mins. | 0.122 |
| 90 mins. | 0.074 |
| 120 mins. | 0.049 |
| 150 mins. | 0.028 |

Figure 3:
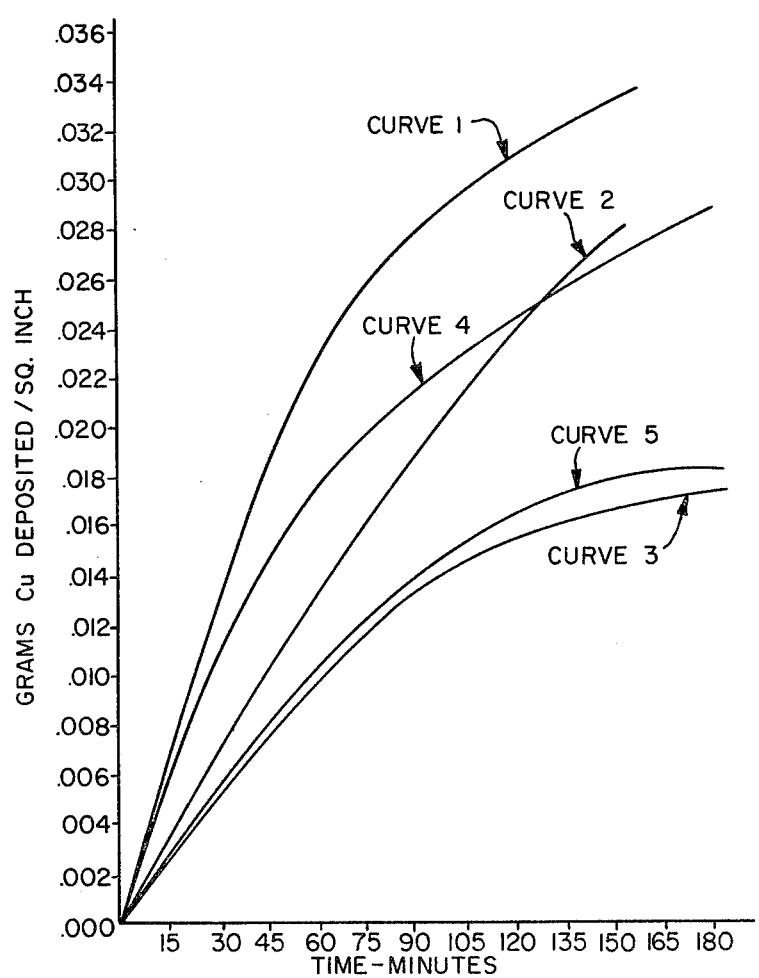
FIG. 3 is a graph demonstrating the rate of metal deposition attainable with the invention in specific examples involving copper.

The cumulative rate of copper deposition (corresponding to the data of Table 1) is shown in FIG. 3, curve 1.

The barrier was weighed initially and after completion of the test, and it was found that about 0.135 grams of copper has been deposited, in substantial agreement with the experimentally determined loss of copper in the solution.

Deposition of a layer of copper was observed within 15 seconds after the flows of solution and hydrogen had started. This initial deposit of copper on the catalytic platinum did not hinder the continued reduction and deposition of copper thereon, as is evidenced by the fact that the reaction was nearly brought to completion (i.e. to 95% copper removal) at the end of 3½ hours.

This finding was indeed surprising since metallic copper is not a catalyst, at ordinary temperatures, for the reaction $H_2 \rightarrow 2H^+ + 2e$ and the initial copper layer would have been expected to arrest the reaction after covering the catalytic platinum of the barrier. One conceivable explanation for this unexpected behavior is the existence of what might be termed a shorted electrochemical fuel cell couple of a hydrogen-on-platinum anode (right side of barrier 2) and a metallic copper cathode (left side of barrier 2) wetted by copper ion-containing electrolyte. This effectively shorted couple continues to function so long as the barrier is wetted by the electrolyte containing some dissolved copper ions. Whatever the explanation, however, it is observed in practice that the reduction and the resulting build up of copper continues up to nearly completion, if desired. This phenomenon, of course, makes the method of the invention most useful in the recovery of copper and like metals.

The techniques before-described have been used to remove the deposited copper, as later more fully described.

EXAMPLE 2

The method of Example 1, using the apparatus and barrier thereof, were repeated except that the recirculating solution was a ferric sulfate solution containing 3.00 gm/l of $Fe^{+++}$. Here the $Fe^{+++}$ was reduced to the $Fe^{++}$ ion. Table 2 shows the concentrations of $Fe^{++}$ produced by this reduction as a function of time. The reduction is associated with the formation of hydrogen ions, the pH column of Table 2 showing the increasing acidity of the solution accompanying the increase in $Fe^{++}$ concentration.

In this experiment, the ferrous ion produced by the reduction remained in solution, in contrast to the deposited copper of Example 1.

TABLE 2

| | 3 g/l $Fe^{+++}$ | |
|---|---|---|
| Time (mins.) | g/l $Fe^{++}$ | pH |
| 0 | .00 | 1.9 |
| 15 | .21 | 1.89 |
| 45 | .688 | 1.75 |
| 75 | 1.03 | 1.71 |
| 105 | 1.30 | 1.65 |
| 135 | 1.52 | 1.59 |

EXAMPLE 3

The method of Example 1, using the apparatus and barrier thereof, was repeated except that the sulfate solution contained 0.30 gm/l of copper and 3.00 gm/l of ferric ion. The appearance of a film of copper was again observed after 12 seconds on the left-hand solution face of the barrier 2. The rate of $Fe^{+++}$ to $Fe^{++}$ reduction is shown in Table 3, and the corresponding rate of copper deposition is shown in FIG. 3, curve 2.

TABLE 3

| | 3.0 g/l $Fe^{+++}$ plus 0.9 g/l $Cu^{++}$ | |
|---|---|---|
| Time (mins.) | g/l $Fe^{++}$ | pH |
| 0 | .00 | 1.90 |
| 5 | 0.134 | 1.90 |
| 15 | 0.335 | 1.85 |
| 30 | 0.668 | 1.80 |
| 60 | 1.27 | 1.68 |
| 90 | 1.69 | 1.60 |
| 120 | 2.27 | 1.55 |

It is seen that the presence of $Fe^{+++}$ slowed copper deposition initially, but faster copper deposition occurred after substantial reduction of $Fe^{+++}$.

The following examples illustrate additional variations of the hydrogen reduction process of the invention involving a typical electrically insulating barrier 2 substrate and typical different ionization catalysts, as well as hydrogen-reduced metals other than copper.

EXAMPLE 4

The method of Example 1 was repeated with the apparatus thereof, using a glass-cloth based barrier 2 having a glass cloth substrate 12 mils thick and having about 19 yarns per inch in each of the warp and fill directions, and provided with a catalyzed and hydrophobic coating by the method of Example 1. The barrier was thus substantially the same as the barrier of Example 1 with respect to platinum particle size, platinum loading and Teflon loading. The copper deposition rate obtained on this barrier using the copper sulfate solution of Example 1, is shown in curve 3 of FIG. 3. It is seen that the copper ion reduction was catalyzed on this barrier, but that the corresponding rate is distinctly slower than that attained with the carbon cloth-based barrier of Example 1 (FIG. 3, curve 1).

EXAMPLE 5

The method of Example 1 was again repeated with the apparatus thereof, except that a conventional platinum-on-carbon catalyst was substituted for the 15–25 Å platinum-on-carbon catalyst of Example 1. The conventional catalyst was prepared by the known technique of impregnating a sample of Vulcan XC-72 carbon with a solution of chloroplatinic acid, followed by evaporation, drying and hydrogen reduction, the ingredients being selected in amounts to produce a platinum-on-carbon containing 10% of Pt by weight. The barrier of this example was then prepared by the method described in Example 1 using this platinum-on-carbon and loading the barrier with 0.34 mg Pt/cm², i.e. about the same as that of Example 1. The copper deposition rate on this barrier using the solution of Example 1, is depicted in curve 4 of the graph of FIG. 3. It is seen that the copper ion reduction is catalyzed by this conventional platinum catalyst, but that it is less effective than the preferred 15–25 Å platinum-on-carbon catalyst, when both are used in substantially equal amounts.

EXAMPLE 6

The method of Example 1 was further repeated except that a palladium-on-carbon catalyst was substituted for the 15–25 Å platinum catalyst of Example 1. The palladium-on-carbon catalyst was prepared by impregnating a sample of Vulcan XC-72 carbon with an aqueous palladium sol, followed by evaporation, drying and hydrogen reduction, the ingredients being selected in amounts to produce a palladium-on-carbon containing 10% palladium. The palladium sol was prepared by solvent extraction, with an organic amine of an aqueous palladium nitrate solution. The barrier 2 of this example was then prepared by the method described in Example 1, using this palladium-on-carbon catalyst and loading the barrier with 0.25 mg Pd/cm²; i.e. nearly the amount, by weight, of the platinum of Example 1. The copper deposition rate on the barrier using the solution of Example 1 is depicted in FIG. 3, curve 5. It is seen that the copper ion reduction is catalyzed by the palladium catalyst but that it is significantly less effective than the platinum-on-carbon catalysts, when all are used in amounts of the same order. (Note that more gram-atoms of Pd per square inch were on the barrier than gram-atoms of Pt per square inch).

EXAMPLE 7

The method of Example 1, using the apparatus and barrier thereof was repeated except that 2 liters of a silver nitrate solution containing 1.5 g/l Ag was recirculated. Build-up of silver was extremely rapid. A loosely adhering silver deposit of 0.53 grams was obtained on the left face of the barrier in 15 minutes.

EXAMPLE 8

The method of Example 1 was repeated except that 2 liters of a chloroplatinic acid solution containing 1.5 g/l Pt was recirculated. About 600 mg of firmly adhering platinum was deposited on the barrier in two hours. The 2"×2" barrier had an initial platinum loading of about 10 mg as the 15–25 Å platinum-on-carbon catalyst.

EXAMPLE 9

The method of Example 1 was repeated except that 2 liters of a mercuric chloride solution containing 1.5 g/l $Hg^{++}$ was recirculated. About 140 mg of firmly adhering mercurous chloride, $Hg_2Cl_2$, was deposited on the barrier in two hours.

A control experiment using the barrier of Example 1 except that no platinum or other hydrogen ionizing catalyst was used thereon and using the method and solution of Example 1, resulted in no copper deposition.

In general, as before discussed, metal deposited on the barrier adheres thereto and needs therefore to be removed therefrom to be put into useable form. With a sufficiently thick deposit on the barrier, such as the silver deposit of Example 7, mechanical stripping is one such technique which is especially useful when the original silver ion-containing solution is not contaminated by other hydrogen-reducible metal ions. As previously described, however, it is often desireable to redissolve the metal from the barrier into a concentrated solution suitable for either electrowinning or electrorefining. In one instance, for example, the area bearing the copper deposit obtained in Example 1 above was contacted with about 5 ml of 1.5 molar sulfuric acid on its coppered face and air was supplied to the gas plenum. Dissolution of the copper from the barrier into this small volume of acid occurred quite readily, thereby producing an acid copper sulfate solution containing a copper concentration of about 27 g/l of copper. This procedure coupled with the hydrogen reduction of Example 1 thus resulted in a nearly 100 fold concentration of copper. The concentrated solution is suitable for electrowinning in conventional cells as well as in the cell described in U.S. Pat. No. 3,793,165 of common assignee.

In an alternate procedure, the coppered barrier of Example 1 was used in a conventional electrorefining cell as the anode. Here the copper deposit was redissolved into the conventional electrorefining electrolyte, a substantially equivalent amount of copper being electrodeposited as massive cathodic copper. Typical experimental conditions for such an electrode refining operation are, for example, shown in Table 27, pages 150–151 of Electrochemical Engineering, by C. L. Mantell, 4th Edition, McGraw-Hill Book Company, New York, 1960.

Whereas the redissolution of copper from the barrier by means of air or oxygen as illustrated above is applicable to barriers having either a conducting or a non-conducting substrate, the stripping of the copper from the barrier by electrorefining requires that the barrier comprise an electrically-conducting substrate that is the barrier having the structure of a hydrogen anode.

In the case of recovering platinum, or like noble metal capable of catalyzing the $H_2 \rightarrow 2H^+ + 2e$ reaction, the above-described incineration technique is the preferred method of removing platinum or the like from the barrier. For example, the barrier of Example 8 with its platinum deposit was incinerated at about 800° C. leaving a residue of platinum weighing 0.5812 grams.

The above examples are merely illustrative of preferred modes of carrying out the invention. Clearly many variations are possible including the recovery of gold, palladium and other hydrogen-reduced metals from an aqueous solution thereof, use of different hydrogen ionizing catalysts, such as, for example, tungsten carbide for the $H_2 \rightarrow 2H^+ + 2e$ reaction and operation of the process in the range of temperatures above freezing but below boiling of the aqueous solution. Further, the method is by no means limited to dilute solutions of the hydrogen-reduced metals, though here the process is especially advantageous. These and other variations which will occur to those skilled in the art are considered to fall within the scope of this invention as defined in the appended claims.

We claim:

1. A process for recovering hydrogen-reduced metals or ions from an aqueous solution of an ionized salt thereof, that comprises, providing a porous hydrophobic catalytic barrier, contacting one surface of the barrier with said solution, and applying hydrogen gas to the other surface, thereby to produce the hydrogen-reduced mtals or ions at said one surface.

2. A process as claimed in claim 1 and in which the solution is an ionized salt of said metal and the hydrogen-reduced metal is deposited on the said one surface of the barrier.

3. A process as claimed in claim 2 and in which the said metal is selected from the group consisting of copper, silver, gold and the platinum metals.

4. A process as claimed in claim 2 and in which said metal is copper and said solution contains copper ions in amount less than about 5 grams/liter of the solution.

5. A process as claimed in claim 2 and in which the deposited metal is removed from the barrier by mechanical stripping.

6. A process as claimed in claim 2 and in which the deposited metal is removed from the barrier by dissolving the deposited metal to produce a concentrated solution of the metal and electrowinning the metal therefrom.

7. A process as claimed in claim 2 and in which the barrier is an electrode and the deposited metal is removed from said barrier by redissolving the deposited metal into an electrorefining electrolyte and electroplated therefrom using the barrier as an anode.

8. A process as claimed in claim 2 and in which the deposited metal is removed from said barrier by incinerating the same.

9. A process as claimed in claim 2 and in which the deposited metal is removed from said barrier by contacting the deposited metal with an electrolyte solution and the said other barrier surface with air or oxygen.

10. The process of claim 1 wherein said solution comprises a partially hydrogen-reducible ion.

11. The process of claim 10 wherein said partially hydrogen-reducible ion is selected from the group consisting of ferric, mercuric and permanganate ions.

12. The process of claim 1 wherein said catalytic barrier is formed by uniformly depositing on and adhering to a porous substrate a substantially uniform mixture of particles of a wet-proofing agent and catalytic noble metal particles.

13. The process of claim 12 wherein said noble metal is platinum and said wet-proofing agent is a fluorinated hydrocarbon polymer.

14. The process of claim 12 wherein said platinum is present in amount between 0.04 and 1.0 gram/sq. ft. of said barrier.

15. The process of claim 12 wherein said porous substrate is electrically conducting.

16. The process of claim 15 and in which the barrier is circuitry-free.

17. The process of claim 15 wherein said substrate is selected from the group of porous carbon, carbon cloth, porous metal and metal screen.

18. The process of claim 12 wherein said substrate is of insulating material.

19. The process of claim 1 wherein said aqueous solution contacts said barrier under turbulent flow conditions.

20. The process of claim 1 wherein said hydrogen reduction is effected at ordinary temperature.

21. The process of claim 1 wherein said metal is copper, said copper having been deposited from a first solution containing a concentration of copper ions of less than 5 grams/liter of solution, and wherein the said other surface of the barrier is contacted by air or oxygen and the deposited copper on said one surface of the barrier is contacted by an electrolyte acid solution in amount to yield a second redissolved copper ion solution containing at least five times the copper ion concentration of said first solution.

22. The process of claim 21 and including the additional step of subjecting said second copper ion solution to electrowinning.

23. A process for recovering hydrogen-reduced metals or ions from an aqueous solution of an ionized salt thereof that comprises, providing in contact with the solution a porous hydrophobic catalytic barrier, and flowing hydrogen gas upon the catalytic barrier to reduce metals or ions from said solution at surface portions of the catalytic barrier contacting the solution.

24. A process as claimed in claim 1 or 23, further comprising agitating the solution to cause turbulent flow thereof onto the barrier.

25. A process as claimed in claim 1 or 23, further comprising directing the solution onto the barrier under rapid flow conditions.

* * * * *